(12) United States Patent
Himmelmann

(10) Patent No.: US 9,205,923 B1
(45) Date of Patent: Dec. 8, 2015

(54) MANUAL OVERRIDE CARGO UNLOADING SYSTEM FOR AIR CUSHION SUPPORTED AIRCRAFT CARGO LOADING ROBOT

(71) Applicant: GOODRICH CORPORATION, Charlotte, NC (US)

(72) Inventor: Richard A. Himmelmann, Beloit, WI (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 14/512,000

(22) Filed: Oct. 10, 2014

(51) Int. Cl.
*B64D 9/00* (2006.01)

(52) U.S. Cl.
CPC .......... *B64D 9/00* (2013.01); *B64D 2009/006* (2013.01)

(58) Field of Classification Search
CPC .......... B65G 1/641; B65G 2201/0264; B65G 2201/0267; B64C 1/20; B64C 1/22; B64D 9/00; B64D 9/003; B64D 1/10
USPC .......................... 244/118.1, 137.1; 198/468.9
See application file for complete search history.

(56) References Cited

U.S. PATENT DOCUMENTS

| | | | | |
|---|---|---|---|---|
| 3,756,544 A | * | 9/1973 | Bader | B64D 9/00 244/137.1 |
| 3,809,268 A | * | 5/1974 | Lutz | B60P 1/00 254/5 C |
| 4,600,169 A | * | 7/1986 | Koster | B64G 1/641 244/118.1 |
| 5,350,270 A | * | 9/1994 | Stallard | B65G 1/06 211/151 |
| 6,427,947 B1 | * | 8/2002 | Rohrlick | B64C 1/22 244/118.1 |
| 7,785,056 B2 | | 8/2010 | Sanford et al. | |
| 2011/0215198 A1 | * | 9/2011 | Panzram | B64C 1/20 244/118.1 |
| 2015/0225082 A1 | * | 8/2015 | Levron | B64D 9/00 244/137.1 |

* cited by examiner

*Primary Examiner* — James R Bidwell

(57) ABSTRACT

A cargo shuttle is described. The cargo shuttle includes a top surface for receiving cargo. The cargo shuttle also includes an aft cargo attachment device positioned on an aft side of the cargo shuttle. The cargo shuttle also includes a forward cargo attachment device positioned on a forward side of the cargo shuttle.

20 Claims, 8 Drawing Sheets

MANUAL OVERRIDE CARGO UNLOADING SYSTEM FOR AIR CUSHION SUPPORTED AIRCRAFT CARGO LOADING ROBOT

FIELD

The present disclosure relates generally to cargo management systems.

BACKGROUND

Conventional aircraft cargo systems typically include various tracks and rollers that span the length of an aircraft. Power drive units ("PDUs") convey cargo forward and aft along the aircraft on conveyance rollers which are attached to the aircraft floor structure. Cargo may be loaded from an aft position on an aircraft and conducted by the cargo system to a forward position and/or, depending upon aircraft configuration, cargo may be loaded from a forward position on an aircraft and conducted by the cargo system to an aft position. Conventional systems are typically designed to accommodate a particular pallet size. Conventional systems are typically comprised of numerous components that may be time consuming to install, replace and maintain.

SUMMARY

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

A cargo shuttle is described. The cargo shuttle includes a top surface for receiving cargo. The cargo shuttle also includes an aft cargo attachment device positioned on an aft side of the cargo shuttle. The cargo shuttle also includes a forward cargo attachment device positioned on a forward side of the cargo shuttle.

Also described is a cargo management system. The cargo management system includes a cargo shuttle and an aft shuttle drive belt coupled to the cargo shuttle. The cargo management system also includes an aft shuttle drive unit that is coupled to the aft shuttle drive belt. The aft shuttle drive unit includes an aft manual drive feature.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option.

As used herein, "aft" refers to the direction associated with the tail of an aircraft, or generally, to the direction of exhaust of the gas turbine. As used herein, "forward" refers to the direction associated with the nose of an aircraft, or generally, to the direction of flight or motion.

Aircraft cargo management systems as disclosed herein allow cargo to be loaded into an aircraft and positioned within the aircraft in a simple, elegant manner. In that regard, aircraft cargo management systems as disclosed herein may reduce part count and associated replacement/wear costs over time.

Figure 1:
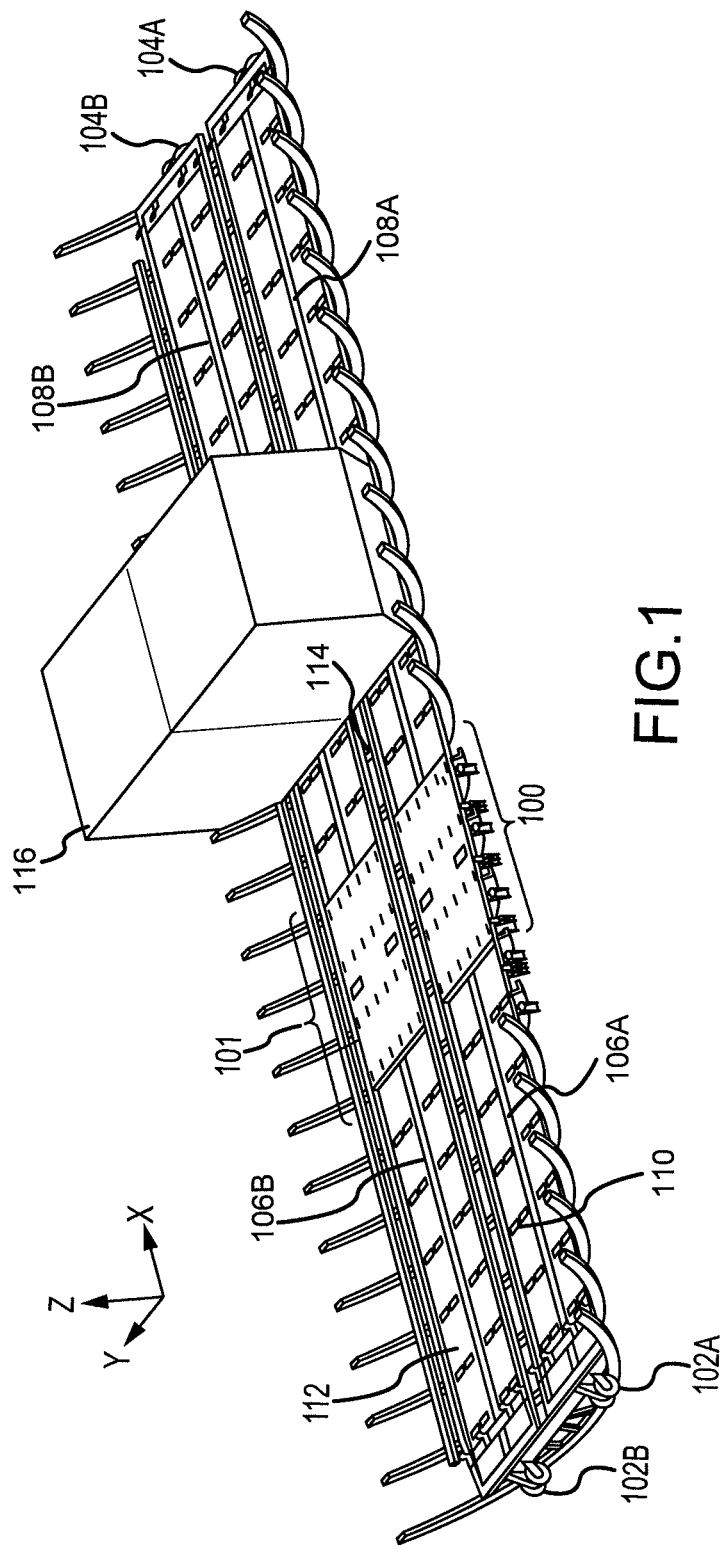
FIG. 1 illustrates a portion of a cargo management system, in accordance with various embodiments.
Figure 2:
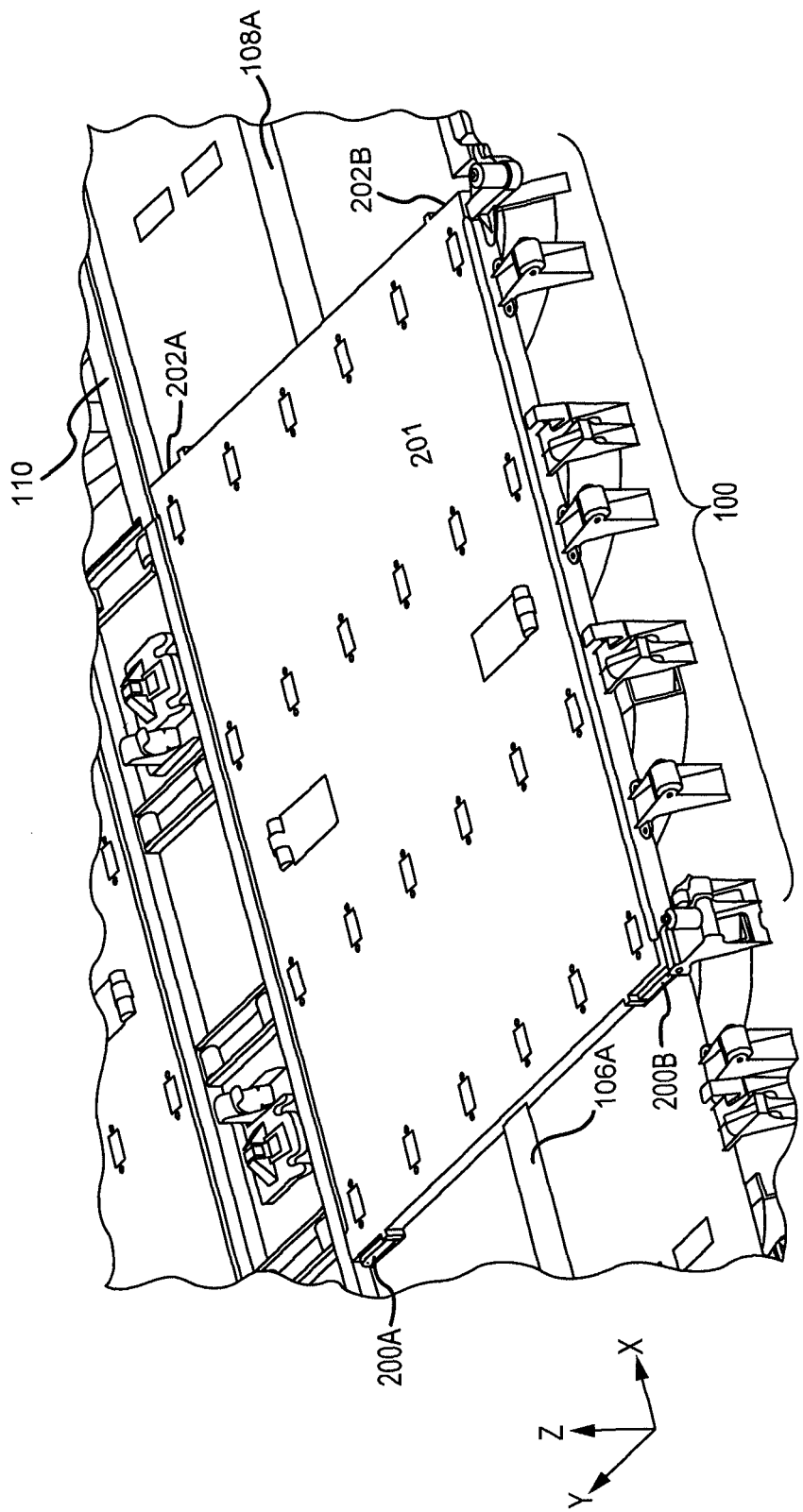
FIG. 2 illustrates a portion of a cargo management system, in accordance with various embodiments.

With reference to FIGS. 1 and 2 an aircraft cargo management system is illustrated using an x, y, and z axes for ease of illustration. Cargo shuttle 100 and 101 are shown forward of an aft portion of an aircraft. Cargo shuttle 100 is coupled to aft shuttle drive belt 106A and cargo shuttle 101 is coupled to aft shuttle drive belt 106B. Aft shuttle drive belt 106A is coupled to aft shuttle drive unit 102A. Aft shuttle drive belt 106B is coupled to aft shuttle drive unit 102B. Floor panel 112 is shown beneath cargo shuttle 100 and 101. As used with respect to cargo shuttle 100 and 101, the term "beneath" may refer to the negative z direction. Support beams 114 are shown laterally adjacent to floor panel 112. Support beams 114 may be mounted to another aircraft component, such as an airframe, and may be capable of supporting the weight of cargo. Floor panel 112 may comprise at least one of a composite material or a metallic material.

Cargo shuttle 100 is coupled to forward shuttle drive belt 108A and cargo shuttle 101 is coupled to forward shuttle drive belt 108B. Forward shuttle drive belt 108A is coupled to forward shuttle drive unit 104A. Forward shuttle drive belt 108B is coupled to forward shuttle drive unit 104B. Cargo 116 is shown as resting on support beams 114. Cargo shuttle 101 may be used to lift cargo 116 off support beams 114 (i.e., cause cargo 116 to move in the positive Z direction) and support cargo 116 for movement forward or aft-ward.

Forward shuttle drive belt 108A, forward shuttle drive belt 108B, aft shuttle drive belt 106A, and aft shuttle drive belt 106B (collectively, a "shuttle belt") may comprise any suitable belt capable of pulling an air cushion cargo shuttle. For example, a shuttle belt may comprise a flat belt. In that regard, a flat shuttle belt may not occupy excess space along the z direction. For example, a shuttle belt may comprise a polyurethane coated belt that includes a communications and power bus. In that regard, the structural support and power/data functions are provided by a single shuttle belt structure. For example, in various embodiments, a shuttle belt may comprise steel wires oriented in parallel and coated with polyurethane to hold the steel wires together, provide anti-friction properties, and noise dampening properties. Among the steel wires may be copper wires or other wires that are capable of carrying an electrical current at any suitable voltage. In that regard, the shuttle belt may comprise one or more copper wires to carry high voltage power and/or low voltage electrical signals that may convey data.

The shuttle belts may be wound around a portion of forward shuttle drive unit 104A, forward shuttle drive unit 104B, aft shuttle drive unit 102A and aft shuttle drive unit 102B (collectively, "shuttle drive unit"). In that regard, a shuttle drive unit may comprise a cylindrical structure (e.g., a bobbin) to which a shuttle belt is affixed. The shuttle drive unit comprises a motive device, such as an electric motor, to rotate the bobbin in a desired direction. The shuttle drive unit may also cause the electric motor to allow the bobbin to rotate. For example, the electric motor may provide a negative torque to the gear reduction system so that power may be regenerated and re-supplied to a power bus.

Thus, as forward shuttle drive unit 104A may be rotating its bobbin to pull forward shuttle drive belt 108A forward, aft shuttle drive unit 102A may allow its bobbin to rotate in response to the force exerted by forward shuttle drive belt 108A through cargo shuttle 100. In like manner, as aft shuttle drive unit 102A may be rotating its bobbin to pull aft shuttle drive belt 106A aft, forward shuttle drive unit 104A may allow its bobbin to rotate in response to the force exerted by aft shuttle drive belt 106A through cargo shuttle 100.

Accordingly, as forward shuttle drive unit 104B may be rotating its bobbin to pull forward shuttle drive belt 108B forward, aft shuttle drive unit 102B may allow its bobbin to freely rotate in response to the force exerted by forward shuttle drive belt 108B through cargo shuttle 100. In like manner, as aft shuttle drive unit 102B may be rotating its bobbin to pull aft shuttle drive belt 106B aft, forward shuttle drive unit 104B may allow its bobbin to freely rotate in response to the force exerted by aft shuttle drive belt 106B through cargo shuttle 101.

Cargo shuttle 100 and 101 may include a top surface 201. Top surface 201 may be a surface on which cargo 116 may rest when cargo 116 is to be moved forward or aft. Cargo shuttle 101 may also include a top surface for receiving cargo.

In various embodiments, the entire cargo shuttle 100 and/or 101 (along with, for example, top surface 201) may be lifted (i.e., displaced in the positive Z direction). This lift may be provided by air pressure beneath cargo shuttle, such as in an air cushion cargo shuttle, or it may be provided by a wedge jacking system. When cargo shuttle 100 and 101 is lifted a predetermined distance, cargo 116 may also be lifted. After the predetermined distance, top surface 201 may be positioned above support beams 114 (i.e., displaced in the positive Z direction to a point above support beams 114). Cargo 116 resting on top surface 201 may also then be lifted above support beams 114, so that when aft shuttle drive unit 102 and/or forward shuttle drive unit 104 is engaged, cargo 116 may be moved forward or aft.

It is preferred that the cargo management system be operable in the event of a loss of electrical power. Therefore, manual override systems have been incorporated into the cargo management system. In the absence of electrical power, cargo shuttle 100 will not have the ability to lift cargo 116. Cargo 116 can weigh up to 10,000 pounds (4546 kg). Therefore, it may not be possible for an operator or operators to manually carry cargo 116 aft or forward on the aircraft.

Because cargo shuttle 100 may not be able to lift cargo 116 above support beams 114 in the absence of electrical power, cargo shuttle 100 may drag cargo along support beams 114. In order to engage cargo 116 so that forward or aft movement of cargo shuttle 100 will also cause cargo 116 to move forward or aft, aft cargo attachment devices 200 and forward cargo attachment devices 202 have been incorporated into cargo shuttle 100. Aft cargo attachment devices 200 (200A and 200B) are positioned on the aft end of cargo shuttle 100 and secure cargo 116 to the aft end of cargo shuttle. Forward cargo attachment devices 202 (202A and 202B) are positioned on the forward side of cargo shuttle 100 and secure cargo 116 to the forward end of cargo shuttle.

Figure 3:
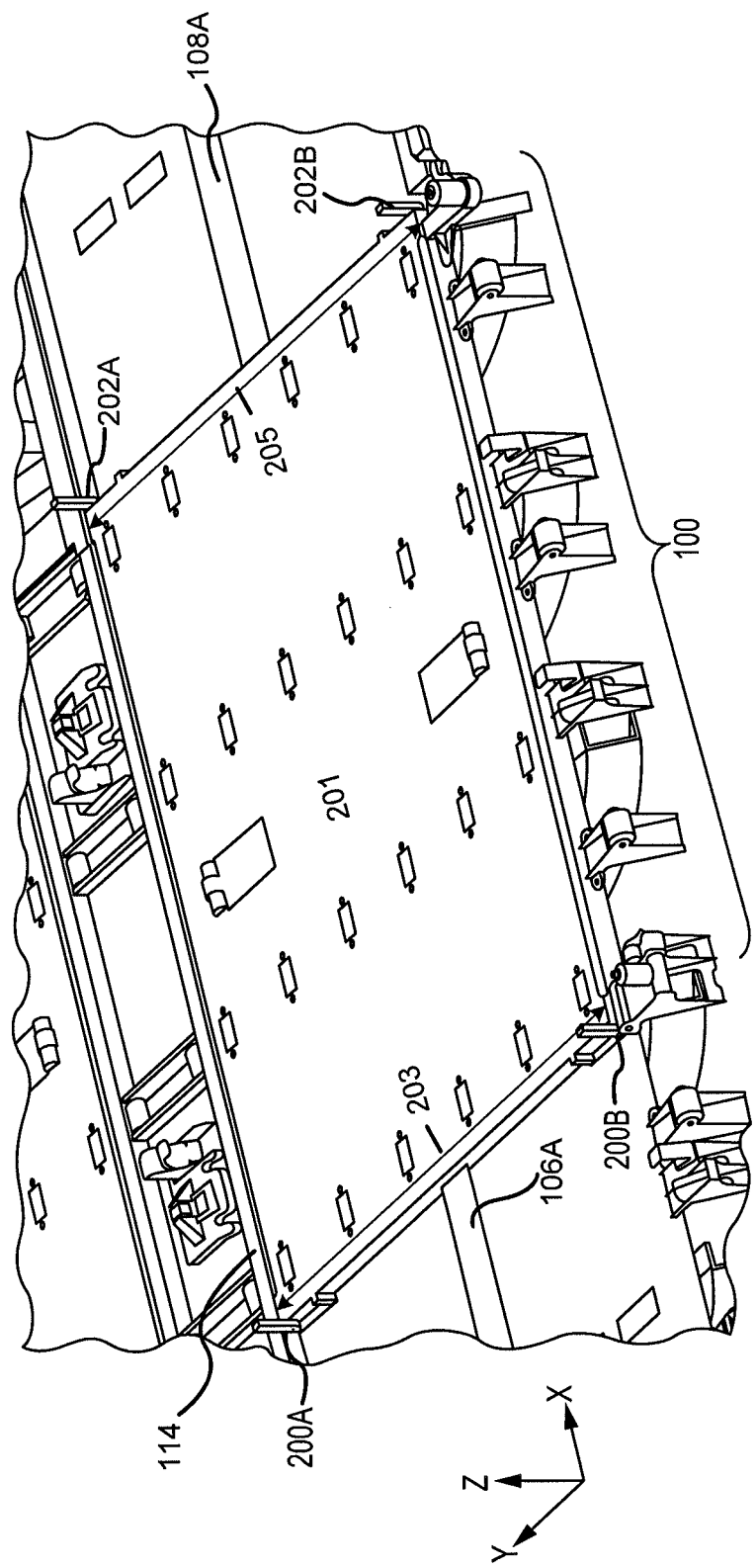
FIG. 3 illustrates a cargo shuttle having engaged aft cargo attachment devices and forward cargo attachment devices, in accordance with various embodiments.

FIG. 3 illustrates cargo shuttle 100 with aft cargo attachment devices 200 and forward cargo attachment devices 202 engaged. Cargo attachment devices may be any device having an interior portion for retaining cargo. In various embodiments, a cargo attachment device may be a hook, post, prism, rod with aperture, or the like. In various embodiments, cargo shuttle 100 may include two aft cargo attachment devices 200 and two forward cargo attachment devices 202.

In various embodiments, aft cargo attachment device 200A may be positioned on the aft end of cargo shuttle 100 near a first side of cargo shuttle 100 and aft cargo attachment device 200B may be positioned on the aft end of cargo shuttle near a second side of cargo shuttle 100. In various embodiments, forward cargo attachment device 202A may be positioned on the forward end of cargo shuttle 100 near the first side of cargo shuttle 100 and forward cargo attachment device 202B may be positioned on the forward end of cargo shuttle 100 near the second side of cargo shuttle 100. In various embodiments, aft cargo attachment devices 200 are spaced apart on the aft end of cargo shuttle 100 by at least 80 percent of a distance 203 of the aft end of cargo shuttle and forward cargo attachment devices 202 are spaced apart on the forward end of cargo shuttle 100 by at least 80 percent of a distance 205 of the forward end of cargo shuttle 100.

As illustrated, aft cargo attachment devices 200 may rotate from a disengaged position (i.e., parallel to the Y axis) to an engaged position (i.e., parallel to the Z axis). While aft cargo attachment devices 200 are in the engaged position (orthogonal to cargo shuttle 100), aft cargo attachment devices 200 can engage cargo 116 on the aft side of cargo 116. Forward cargo attachment devices 202 can become parallel to the forward end of cargo shuttle 100 (i.e., parallel to the Y axis) when engaged and orthogonal to the forward end of cargo shuttle 100 (i.e., parallel to the Z axis) when disengaged. While engaged, forward cargo attachment devices 202 can engage the forward side of cargo 116.

While aft cargo attachment devices 200 and forward cargo attachment devices 202 are engaged and cargo shuttle 100 is moved forward or aft, aft cargo attachment devices 200 and forward cargo attachment devices 202 cause cargo 116 to remain on cargo shuttle 100. Therefore, when cargo shuttle 100 cannot provide lift to cargo 116, cargo 116 may still be moved forward and/or aft by the exertion of force on aft shuttle drive belt 106A or forward shuttle drive belt 108A.

Aft cargo attachment devices 200 may be positioned on aft side of cargo shuttle 100 in such a position that cargo 116 may tend to resist slipping off cargo shuttle 100 in response to cargo shuttle 100 moving forward or aft. Likewise, forward cargo attachment devices 202 may be positioned on the forward side of cargo shuttle 100 such that cargo 116 may tend to resist slipping off cargo shuttle 100 in response to cargo shuttle moving forward or aft.

FIG. 3 illustrates two aft cargo attachment devices 200 and two forward cargo attachment devices 202. In various embodiments, cargo shuttle 100 can include more or less aft cargo attachment devices and/or forward cargo attachment devices.

When it is desired to displace cargo 116 aft or forward and cargo is not positioned above cargo shuttle 100 (i.e., cargo shuttle 100 is not aligned with cargo 116 in the X direction and lower in the Z direction than cargo 116), aft shuttle drive belt 106A and/or forward shuttle drive belt 108A is engaged so as to move cargo shuttle 100 forward or aft, beneath cargo 116. In response to cargo shuttle 100 being beneath cargo 116, aft cargo attachment devices 200 and forward cargo attachment devices 202 may be engaged. Once aft cargo attachment devices 200 and forward cargo attachment devices 202 are engaged, aft shuttle drive belt 106A or forward shuttle drive belt 108A may be engaged to move cargo shuttle 100, and thus cargo 116, forward or aft.

As mentioned above, cargo 116 may weigh up to 10,000 pounds (4546 kg). Therefore, in various embodiments, aft cargo attachment devices 200 and forward cargo attachment devices 202 may withstand the forces exerted by cargo 116 without failure. In various embodiments, cargo shuttle 100 will slide along floor panel 112 over bushings 110. Bushings 110 may be polytetrafluoroethylene (PTFE) (available under the trademark TEFLON) bushings having a friction coefficient of 0.05. In various embodiments, aft cargo attachment devices 200 and forward cargo attachment devices 202 may be designed to support at least 500 pounds, which is equal to the friction coefficient of PTFE (0.05) times the 10,000 pound (4546 kg) mass of cargo 116.

Figure 4:
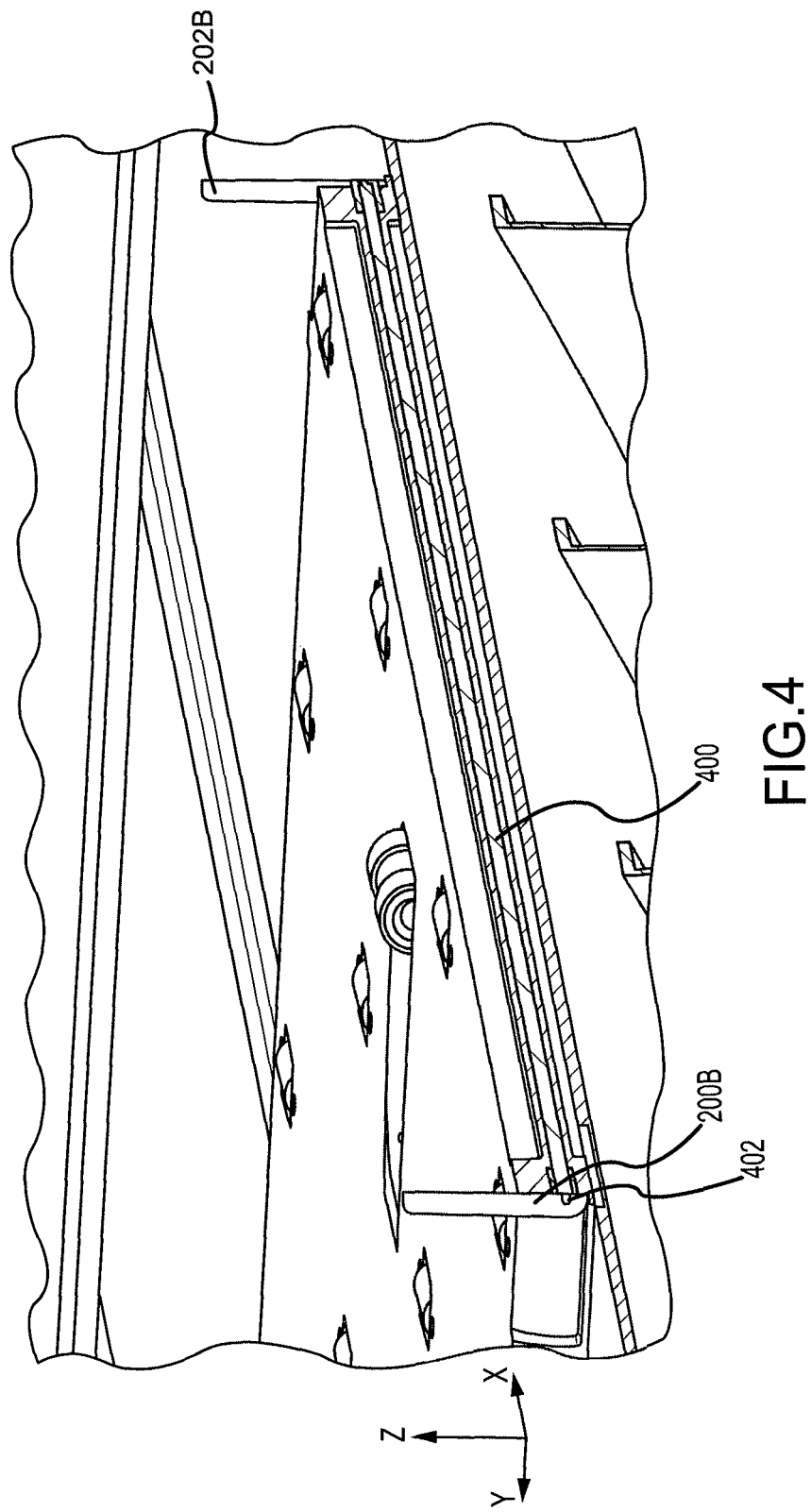
FIG. 4 illustrates a cross-sectional view of a cargo shuttle between an aft cargo attachment device and a forward cargo attachment device, in accordance with various embodiments.

FIG. 4 illustrates a cross-sectional view of cargo shuttle 100 between aft cargo attachment device 200B and forward cargo attachment device 202B. As illustrated, a pivot rod 400 connects aft cargo attachment device 200B to forward cargo attachment device 202B. A similar pivot rod exists between aft cargo attachment device 200A and forward cargo attachment device 202A. Bushings 402 are positioned around aft cargo attachment device 200B and forward cargo attachment device 202B to allow pivot rod 400 to easily rotate.

Pivot rod 400 allows for easy engagement or disengagement of aft cargo attachment device 200B and forward cargo attachment device 202B. For example, if aft cargo attachment device 200B is manually engaged by lifting aft cargo attachment device into the engaged position, pivot rod 400 will cause forward cargo attachment device 202B to also become engaged. When cargo 116 is loaded into the aircraft, cargo may be loaded in a compact fashion. This saves space in the cargo bay of the aircraft. However, compact loading of cargo may make it difficult for an operator to move between pieces of cargo. Pivot rod 400 allows forward cargo attachment device 202B to become engaged by engaging aft cargo attachment device 200B so that forward cargo attachment device 202B can be engaged even when difficult for an operator to physically reach forward cargo attachment device 202B. Pivot rod similarly allows aft cargo attachment device 200B to become engaged by engaging forward cargo attachment device 202B.

In exemplary embodiments, cargo is loaded from the aft side of the aircraft to the forward side of the aircraft. In order to unload cargo, cargo shuttle 100 may move from the aft side of the aircraft towards the forward side of the aircraft, engage cargo 116, and then return to the aft side of the aircraft where cargo 116 can be unloaded. In order to do this, cargo shuttle is moved in the forward direction by engaging forward shuttle drive belt 108A. When cargo shuttle 100 is in place under cargo 116, aft cargo attachment devices 200 are engaged. Because pivot rod 400 causes forward cargo attachment device 202B to become engaged when aft cargo attachment device 200B is engaged, forward cargo attachment devices 202 become engaged when aft cargo attachment devices 200 become engaged. Therefore, an operator does not need to position himself forward of cargo 116. Once aft cargo attachment devices 200 and forward cargo attachment devices 202 are engaged, aft shuttle drive belt 106A can become engaged to move cargo shuttle 100, and thus cargo 116, aft until it reaches a cargo unloading position.

Figure 5:
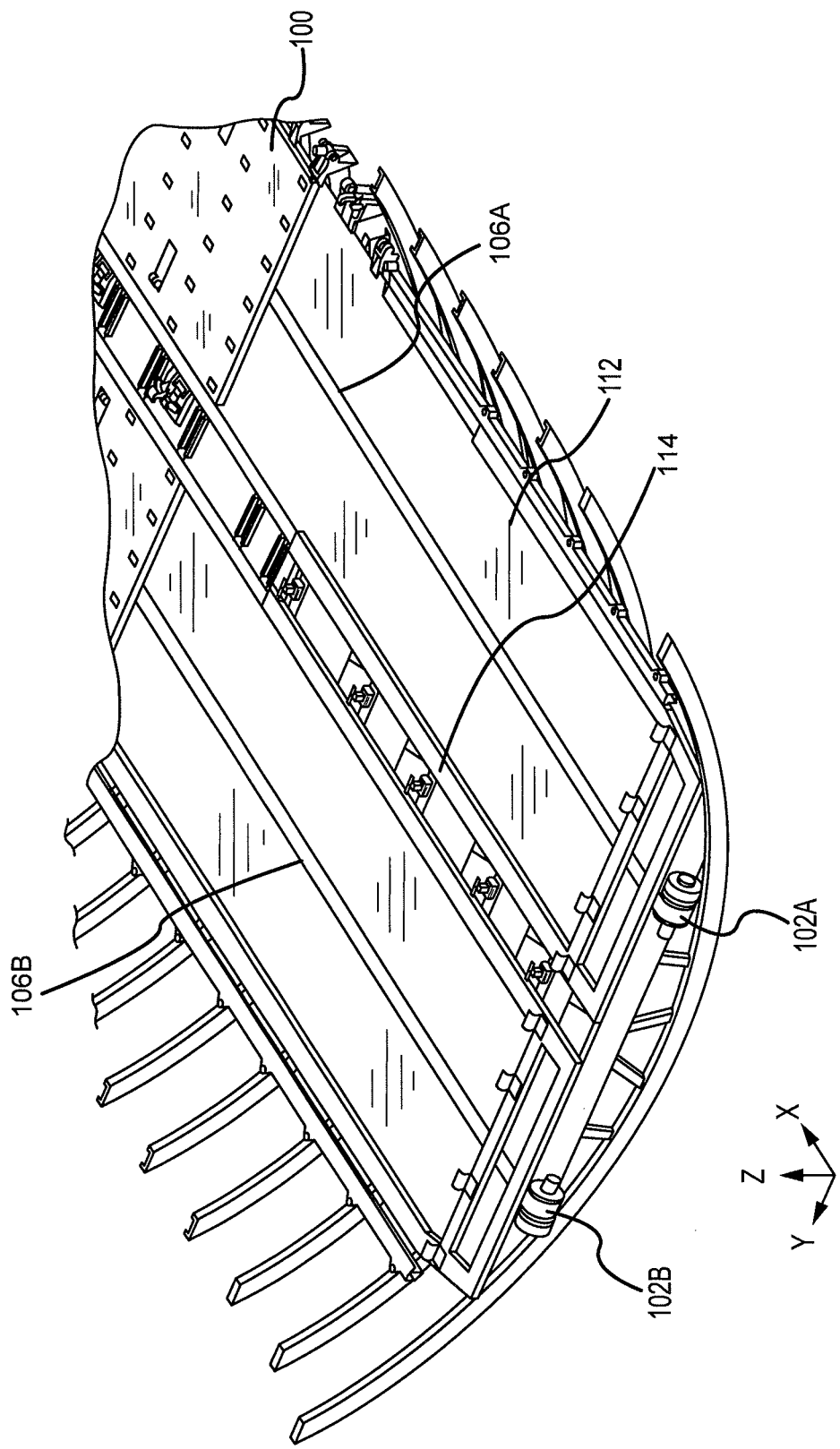
FIG. 5 illustrates a close-up view of an aft portion of a cargo management system, in accordance with various embodiments.

FIG. 5 illustrates a close-up view of an aft portion of a cargo management system. The aft portion of cargo management system includes aft shuttle drive units 102, aft shuttle drive belts 106, floor panel 112 and support beams 114. Cargo management system includes a manual override of shuttle drive units. In the absence of power, shuttle drive units cannot operate to engage shuttle drive belts. Therefore, a way to hand turn aft shuttle drive unit 102 has been incorporated.

Figure 6:
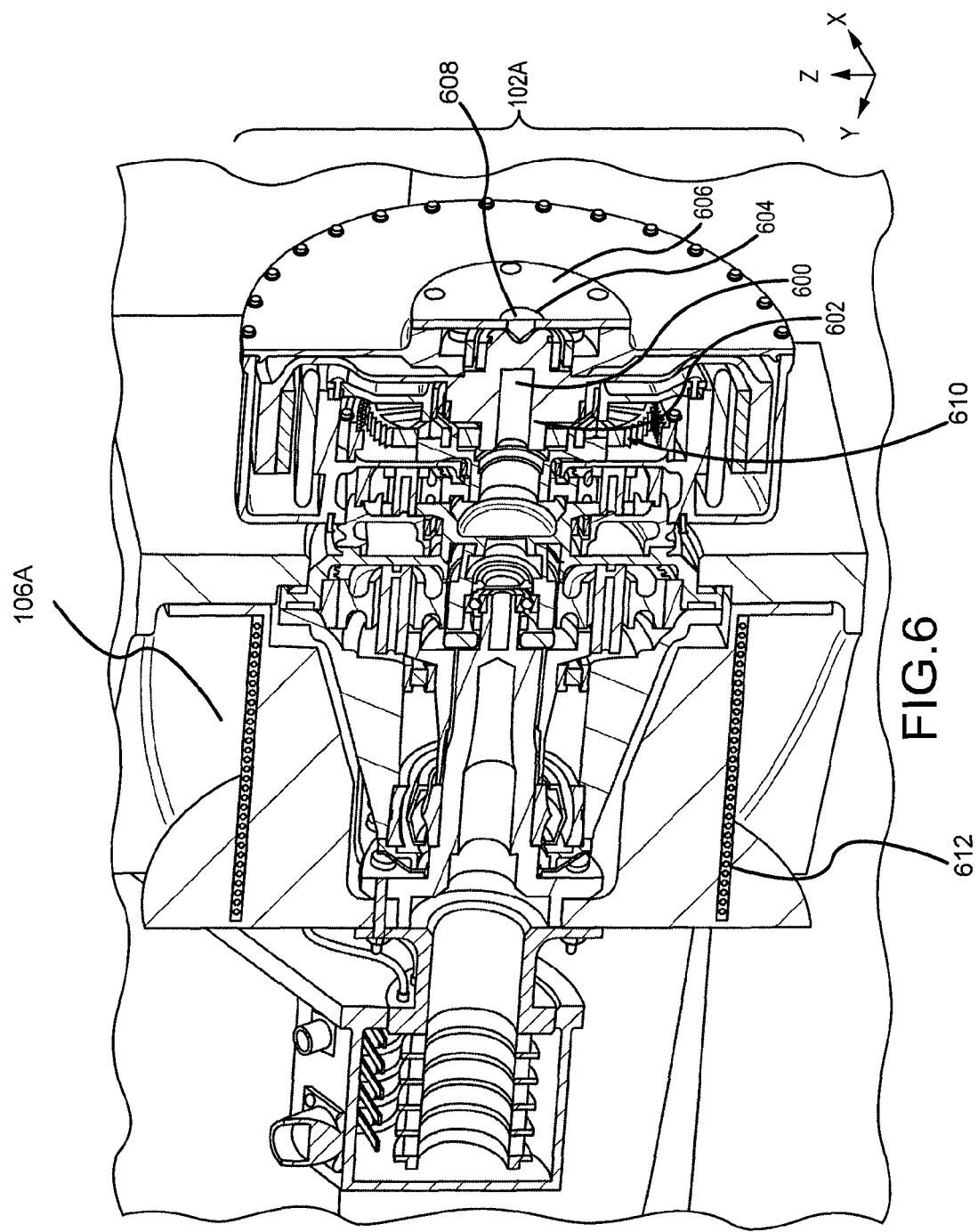
FIG. 6 illustrates a cross-sectional view of an aft shuttle drive unit, in accordance with various embodiments.

FIG. 6 illustrates a cross-sectional view of aft shuttle drive unit 102A. Aft shuttle drive belt 106 is positioned around a belt sheave 612. In response to belt sheave 612 rotating, aft shuttle drive belt 106A becomes engaged. Belt sheave 612 is coupled to gear reduction system 610. A motor rotor 602 rotates by converting electrical energy to mechanical energy. In response to motor rotor 602 rotating, gear reduction system 610 becomes engaged. In response to gear reduction system 610 becoming engaged, belt sheave 612 rotates, causing aft shuttle drive belt 106A to become engaged.

In the absence of electrical power, motor rotor 602 cannot rotate. Therefore, gear reduction system 610 cannot become engaged and aft shuttle drive unit 102A cannot engage aft shuttle drive belt 106A.

In order to allow manual override of aft shuttle drive unit 102A, a drive feature 600 has been included in aft shuttle drive unit 102A. Drive feature 600 may be a female drive feature that is adapted to receive a driver, such as a crank. Drive feature 600 can have any shape, such as square, triangular, star shaped, hexagonal or the like. In preferred embodiments, drive feature 600 may be adapted to receive a square driver. In response to drive feature 600 being rotated, motor rotor 602 is caused to rotate.

In order to manually operate aft shuttle drive unit 102A, a driver may be inserted into drive feature 600. The driver may then be rotated external to aft shuttle drive unit 102A, causing motor rotor 602 to rotate. In response to motor rotor 602 rotating, gear reduction system 610 engages causing belt sheave 612 to rotate. In response to belt sheave 612 rotating, aft shuttle drive belt 106A becomes engaged and cargo shuttle 100 can be moved in the aft direction. Each aft shuttle drive unit 102 and forward shuttle drive unit 104 includes this manual override feature.

Aft shuttle drive unit 102A includes a motor end cover 606. Motor end cover 606 encloses the internal components of aft shuttle drive unit 102A. In order to access drive feature 600, an access hole 604 is designed into motor end cover 606.

Access hole 604 allows a driver to be inserted through motor end cover 606 so that the driver can reach drive feature 600.

It may be preferred for debris to not enter aft shuttle drive unit 102A. If debris does enter aft shuttle drive unit 102A, it may reach gear reduction system 610 and/or other internal components and cause aft shuttle drive unit 102A to not function optimally. In order to prevent debris from entering aft shuttle drive unit 102A, an access hole plug 608 may be provided. Access hole plug 608 may be adapted to fit into access hole 604 so that debris does not enter aft shuttle drive unit 102A. Access hole plug 608 may be adapted to attach to motor end cover 606 in a way that is easy to remove. For example, access hole plug 608 may snap into access hole 604. In various embodiments, access hole plug 608 may also screw into access hole 604. In order to reach drive feature 600 with a driver, access hole plug 608 may be removed.

In various embodiments, motor rotor 602 may include a shaft having an extended length such that it extends through motor end cover 606. Drive feature 600 may be positioned at an end of the shaft that is external to aft shuttle drive unit 102A. Motor end cover 606 may include a dynamic seal enclosing the shaft to prevent debris from entering aft shuttle drive unit 102A.

Figure 7:
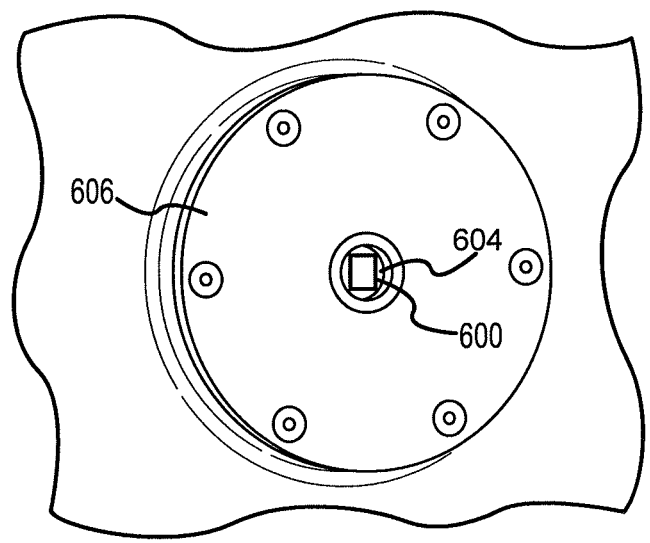
FIG. 7 illustrates a motor end cover with an access hole plug removed, in accordance with various embodiments.

FIG. 7 illustrates motor end cover 606 with access hole plug 608 removed. As illustrated, access hole 604 is positioned within motor end cover 606. In preferred embodiments, access hole 604 may be positioned in the center of motor end cover. Within access hole 604 is drive feature 600. In FIG. 7, drive feature 600 is a square drive feature. Therefore, in order to rotate drive feature 600 (and thus motor rotor 602), a square driver may be inserted through access hole 604 into drive feature 600. The driver may then be rotated, causing motor rotor 602 to rotate.

Figure 8:
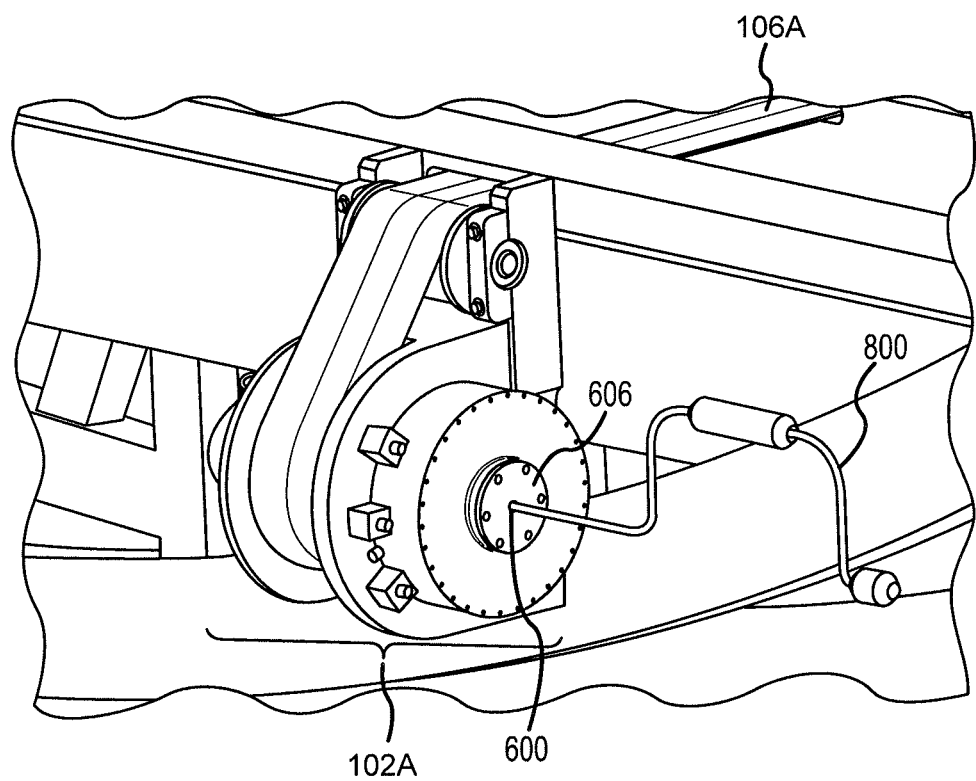
FIG. 8 illustrates an enlarged view of an aft shuttle drive unit being driven by a crank, in accordance with various embodiments.

FIG. 8 illustrates an enlarged view of aft shuttle drive unit 102A. In FIG. 8, a crank 800 is used as a driver for drive feature 600. A driver end of crank 800 is inserted through access hole 604 and is positioned within drive feature 600. In response to crank 800 being rotated, motor rotor 602 will rotate, causing aft shuttle drive belt 106A to become engaged.

In that regard, drive feature 600 and aft cargo attachment devices 200 and forward cargo attachment devices 202, both individually and collectively, enable manual override of the cargo system. Aft cargo attachment devices 200 and forward cargo attachment devices 202 will allow cargo to become secured to cargo shuttle 100. Drive feature 600 of aft shuttle drive units 102 and forward shuttle drive units 104 allow electricity-free movement of cargo shuttle 100 and 101 forward and/or aft on the aircraft.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A cargo shuttle configured to lift cargo, comprising:
a top surface for receiving cargo;
a first aft cargo attachment device positioned on an aft side of the cargo shuttle and adapted to rotate between an engaged position and a disengaged position; and
a first forward cargo attachment device positioned on a forward side of the cargo shuttle and adapted to rotate between an engaged position in response to the first aft cargo attachment device being rotated to the engaged position and a disengaged position in response to the first aft cargo attachment device being rotated to the disengaged position.

2. The cargo shuttle of claim 1, further comprising a second aft cargo attachment device and a second forward cargo attachment device.

3. The cargo shuttle of claim 2, wherein the second aft cargo attachment device is spaced at a distance of at least eighty percent of a length of the aft side of the cargo shuttle from the first aft cargo attachment device and wherein the second forward cargo attachment device is spaced at a distance of at least eighty percent of a length of the forward side of the cargo shuttle from the first forward cargo attachment device.

4. The cargo shuttle of claim 1, wherein the first aft cargo attachment device and the first forward cargo attachment device are each perpendicular to a floor panel when they are in the engaged position and are each parallel to the floor panel when they are in the disengaged position.

5. The cargo shuttle of claim 1, further comprising a pivot rod attached to the first aft cargo attachment device and the first forward cargo attachment device such that rotation of the first aft cargo attachment device is transferred to the first forward cargo attachment device via the pivot rod.

6. The cargo shuttle of claim 1, wherein the first aft cargo attachment device is a first rectangular prism and the forward cargo attachment device is a second rectangular prism.

7. A cargo management system comprising:
a cargo shuttle;
an aft shuttle drive belt coupled to the cargo shuttle; and
an aft shuttle drive unit coupled to the aft shuttle drive belt and including an aft manual drive feature and a motor rotor coupled to the aft manual drive feature, such that the motor rotor rotates in response to rotation of the aft manual drive feature.

8. The cargo management system of claim 7, further comprising a gear reduction system coupled between the aft shuttle drive belt and the aft manual drive feature.

9. The cargo management system of claim 7, wherein:
the aft shuttle drive unit includes a belt sheave coupled to the motor rotor and to the aft shuttle drive belt; and
in response to rotation of the aft manual drive feature, the belt sheave applies tension to the aft shuttle drive belt.

10. The cargo management system of claim 7, wherein the aft manual drive feature is accessed via an access hole.

11. The cargo management system of claim 10, further comprising an access hole plug for closing the access hole.

12. The cargo management system of claim 7, wherein the aft manual drive feature is a female manual drive feature.

13. The cargo management system of claim 7, wherein the aft manual drive feature is a square manual drive feature.

14. The cargo management system of claim 7, wherein in response to rotation of the aft manual drive feature, tension is applied to the aft shuttle drive belt causing the cargo shuttle to be disposed aft-ward.

15. The cargo management system of claim 7, further comprising a forward shuttle drive belt and a forward shuttle drive unit coupled to the forward shuttle drive belt and including a forward manual drive feature.

16. A cargo management system comprising:
a cargo shuttle;
an aft shuttle drive belt coupled to the cargo shuttle; and
an aft shuttle drive unit coupled to the aft shuttle drive belt and including an aft manual drive feature, wherein in response to rotation of the aft manual drive feature, tension is applied to the aft shuttle drive belt causing the cargo shuttle to be disposed aft-ward.

17. The cargo management system of claim 16, wherein:
the aft shuttle drive unit includes a belt sheave adapted to apply the tension to the aft shuttle drive belt in response to rotation of the aft manual drive feature.

18. The cargo management system of claim 16, wherein the aft manual drive feature is accessed via an access hole.

19. The cargo management system of claim 16, further comprising a gear reduction system coupled between the aft shuttle drive belt and the aft manual drive feature.

20. The cargo management system of claim 16, further comprising a forward shuttle drive belt and a forward shuttle drive unit coupled to the forward shuttle drive belt and including a forward manual drive feature.

\* \* \* \* \*